United States Patent [19]
Wettermark et al.

[11] Patent Number: 5,431,998
[45] Date of Patent: Jul. 11, 1995

[54] DIMENSIONALLY GRADED CONDUCTIVE FOAM

[75] Inventors: Urszula G. Wettermark, Fort Worth; Gregory H. Worrell, Galveston, both of Tex.

[73] Assignee: Lockheed Corporation, Fort Worth, Tex.

[21] Appl. No.: 61,964

[22] Filed: May 14, 1993

[51] Int. Cl.⁶ .......................... B32B 5/14; B32B 3/26; B32B 9/00

[52] U.S. Cl. ............................. 428/310.5; 428/304.4; 428/318.4

[58] Field of Search ............... 428/308.4, 304.4, 310.5, 428/318.4

[56] References Cited

U.S. PATENT DOCUMENTS

| | | |
|---|---|---|
| 3,574,295 | 4/1971 | Hajek . |
| 4,287,243 | 9/1981 | Neilsen . |
| 4,468,291 | 8/1984 | Naarmann et al. . |
| 4,547,270 | 10/1985 | Naarmann . |
| 4,557,807 | 12/1985 | Preston et al. . |
| 4,604,427 | 8/1986 | Roberts et al. . |
| 4,617,228 | 10/1986 | Newman et al. . |
| 4,617,353 | 10/1986 | Myers . |
| 4,636,430 | 1/1987 | Moehwald . |
| 4,696,835 | 9/1987 | Mau et al. . |
| 4,707,527 | 11/1987 | Druy et al. . |
| 4,710,401 | 12/1987 | Warren, Jr. et al. ............... 427/121 |
| 4,764,422 | 8/1988 | Hill et al. . |
| 4,798,686 | 1/1989 | Hocker et al. . |
| 4,803,096 | 2/1989 | Kuhn et al. . |
| 4,877,646 | 10/1989 | Kuhn et al. . |
| 5,063,125 | 11/1991 | Yuh et al. . |
| 5,063,384 | 11/1991 | Novak et al. . |
| 5,066,424 | 11/1991 | Dixon et al. . |
| 5,132,490 | 7/1992 | Aldissi . |
| 5,162,135 | 11/1992 | Gregory et al. .................... 427/121 |

OTHER PUBLICATIONS

Advances in the Chemistry of Conducting Organic Polymers: a Review, J. Reynolds, Journal of Molecular Electronics, vol. 2, 1–21.

Electrochemical Preparation and Characterization of Conducting Polymers, A. Daz, Chemica Scripta 17.

New Aspects on Intrinsically Conducting Organic Systems and their Synthesis, H. Naarmann, Macromol. Chem. Macromol. Symp. 1987 8,1.

A Chemical Route to Pyrrole Polymer Films, M. Salmon, K. K. Kanazawa A. F. Diaz; M. Krounbi; Journal of Polymer Science: Polymer Letters Edition, 1982, 20, 187.

An Electrically Conductive Plastic Composite Derived from Polypyrrole and Poly(vinyl Chloride), M. A. De Paoli; R. J. Waltman, A. F. Diaz; Bargon, Journal of Polymer Science, Polymer Chemistry Edition, 1985, 23, 1698.

Polymer–polypyrrole alloy films as semitransparent organic conductors, O. Niwa, M. Hikita, T. Tamamura; Applied Physics Letters, 1985 46, 4.

Electrochemical Preparation of Electrically Conducting Polyurethane/Polyaniline Composite, Q. Pei, X. Bi; Journal of Applied Polymer Science, 1989, 38, 1819.

An Electrically Conductive Composite Prepared by Electrochemical Polymerization of Pyrrole into Polyurethane, Z Bi, Q. Pei, Synthetic Metals; 1987, 22, 145.

Optimum Reaction Conditions for the Polymerization of Pyrrole by Iron (III) Chloride in Aqueous Solution, S. P. Armes; Synthetic Metals, 1987, 20, 365.

*Primary Examiner*—James D. Withers
*Attorney, Agent, or Firm*—Grady K. Bergen

[57] ABSTRACT

A dimensionally graded electroconductive and electromagnetically responsive composite material is produced by contacting a polyurethane open cell foam substrate with a solution of an oxidatively polymerizable compound, such as pyrrole, that is polymerized to form a thin electroconductive polymer coating on the foam's surfaces. The reaction, wherein the compound is oxidized and polymerized to form a conductive polymer occurs over time. By varying the amount of time the porous foam substrate is in contact with the reacting solution a graded amount of electroconductive polymer is deposited on the foam substrate. The electrical activity of the resultant electrically conducting polyurethane/polypyrrole composite foam is measured as a Free Field Transmission loss at the microwave frequency of 10 GHz and expressed in "−dB". The polyurethane/polypyrrole composite foam with dimensionally graded electrical conductivity/activity constitutes a new bulk absorber.

25 Claims, 3 Drawing Sheets

DIMENSIONALLY GRADED CONDUCTIVE FOAM

BACKGROUND OF THE INVENTION

1. Field of the Invention

This invention relates to a method of producing a dimensionally graded electroconductive composite material using a polyurethane foam that is coated with an electrically conductive polymer. The composite material that is formed can be used as an electromagnetically responsive bulk absorber. The conductivity gradient is achieved during a one time chemical reaction process that occurs over time.

2. Description of the Prior Art

Bulk absorber materials are useful for electromagnetic screening of aircraft structures and electronics from radar detection. They can also be used for the construction of radar range ground planes and serve as electromagnetically lossy filler material. Bulk absorbers can be made from an otherwise nonconductive material and preparing an electrically conductive composite by combining it with other, electrically conducting components.

Traditionally, nonconductive materials, for example polymeric materials, have been made electrically conductive by blending or loading the nonconductive material with such conductors as electroactive graphite, carbon black, metal oxides, metal particles and others. Often, such electroactive components consist of metal powder, flakes, wires, thin pattern metal depositions or metal sputtering. In order to obtain the desired electrical activity in the composite material, high particle content may be required, typically as much as 40 percent by weight. When a high conducting particle content is present, the mechanical and physical properties of the resulting composite material may become severely affected. When metallic particles or loadings are involved, a deterioration of the mechanical stability and delamination of the composite structure may occur due to the poor polymer to metal adhesion in the loaded composite/laminate. The high particle content usually increases the weight of the electrically active composite materials significantly. When the composite material is to be used in applications where added weight is undesirable, such as in aircraft, this can be a serious disadvantage.

The preparation process of a highly loaded polymer/metal or polymer/graphite composite is difficult and time consuming, and requires the use of specialized processing equipment. In effect, these polymer/metal or polymer/carbon black composite absorbers, with or without a conductivity gradient, are mechanically weak, heavy by weight, difficult to prepare and expensive.

Presently, a compatible to this invention, commercially available bulk absorber based on polyurethane foam can be produced by coating the open cell polyurethane foam with a carbon black powder. This bulk absorber is used on a large scale in anechoic chambers, radar/radio frequency testing facilities, and electromagnetic (EM) screening of buildings and devices. The bulk absorber is produced by soaking polyurethane foam in a carbon black slurry (ink) and then drying the foam. The amount of deposited carbon is measured by weight. The resulting electrical activity and the electromagnetic transmission loss through the coated foam depends on the amount/weight of deposited carbon black. The correlation between the amount of deposited carbon black and the resulting transmission loss is experimentally established.

The carbon black ink slurry contains other chemical ingredients to permit the adhesion of carbon black powder on the foam surfaces. Usually, polyurethane foam of one inch thickness is handled this way, although thicker foams can be coated. When higher transmission loss is required, thicker coatings of carbon black are applied by repeating the coating and drying process on the foam. Significant amounts of carbon black are then deposited on the foams. With higher carbon black loadings, the resulting foam composites are heavy by weight and stiff. The carbon black coating easily crumbles off the foam. Coated foams with 0-30 dB of electromagnetic loss can be produced.

A dimensional conductivity gradient in the polyurethane/carbon black foam can be obtained by combining (gluing) fragments of coated foams prepared previously, each of varying conductivity/electromagnetic transmission loss value. It is not possible to grade the amount of the electroactive coating on one continuous piece of polyurethane foam, using the carbon black slurry ink method. A new, improved method of producing a light weight polyurethane bulk absorber is described in this invention.

Some of the problems of preparing composite bulk absorber materials have been circumvented by developing composite materials using electroconductive polymers. Electroconductive polymers, such as polypyrrole, have been known for about 20 years and can be prepared in electrochemical and chemical reactions as films or powders. The electrical conductivity achieved in these polymers can be more than 1,000 ohm$^{-1}$cm$^{-1}$. The chemically and physically stable conducting polypyrrole can be readily prepared. While the electroconductivity of polymers is an attractive attribute, their non-processability due to general lack of solubility in common solvents presents a major drawback. Free standing conductive polymer films are often brittle, thus their industrial utility is limited. These limitations can be circumvented by preparing flexible and stable electroconducting polymer/polymer composites that can be prepared in a variety of ways.

Electroconductive composites may be prepared by polymerizing an electroconductive polymer onto the existing structure of a nonconductive material. Such composites have been prepared using a variety of compounds and methods. Both electrodeposition and chemical oxidation methods can be used to produce these electroconducting composite materials.

Conducting composite films that have been prepared electrochemically include polypyrrole/polyvinyl chloride, polypyrrole/polyurethane and polyaniline/polyurethane among others. These composite materials were prepared in the form of thin films on the surface of an anode. The nonconductive polymer host was first dissolved and coated on the surface of the anode prior to electrodeposition of the conductive polymer into the host's matrix. Other soluble polymers can be impregnated with a conducting polymer network in a similar fashion. A flexible and stable composite film can be obtained this way. The evidence suggests that the resulting composites combine the advantageous properties of the polymer host (mechanical stability, flexibility and overall durability) and the conductivity of the interpenetrating conducting polymer network.

Of the electroconductive polymers known to date, polypyrrole has been found to be one of the best candidates for the preparation of electroconductive composites with other materials. Polypyrrole is an extremely stable material with good chemical, mechanical and electrical stability that changes little over time.

The chemical polymerization process can also be used to deposit conductive polymers on the surfaces and inside the structures of nonconductive materials. This generally involves contacting the nonconductive host with such polymerizable compounds as pyrrole or aniline or their derivatives. These monomer compounds can be polymerized to form an electroconductive polymer that forms as a deposit on the nonconductive substrate. The following patents disclose the preparation of electroconducting composites by a chemical deposition of polypyrrole on nonconducting substrates.

U.S. Pat. No. 4,604,427 describes a chemical method of preparing an electronically conducting polymer blend by impregnating a non-porous, swellable or soluble polymer host with pyrrole or aniline or their derivative monomers, and oxidizing the monomers to form electroconducting polymers within the host polymer network. Using this method, polymeric materials can be impregnated by a conducting polymer up to one millimeter deep and impart electrical conductivity to the surface layer of nonconducting non-porous polymers. Other porous materials can be made conducting by depositing electroconducting polymers on their surfaces.

U.S. Pat. No. 4,617,228 describes and gives examples of the preparation of the electroconducting composites comprised of fiberglass fabric coated with the electroconducting polypyrrole, in organic solvents. This patent claims that all other dielectric porous materials can be used to prepare electroconducting composites with polypyrrole in a similar process or repeated process treatment if higher conductivity levels are desired.

U.S. Pat. No. 4,803,096 and 4,877,646 describe the preparation of electrically conducting fabrics by depositing coherent polypyrrole coating on surfaces of fabric fibers. This process took place in dilute water solutions, with the use of complexing agents to aid the uniformity of the coatings. Fiberglass, natural and synthetic organic fibers could be coated by this method. Numerous examples presented in these two patents show how various reaction parameters (concentrations of reactants, reaction time, use of surface active agents, reaction temperature, choice of oxidant, doping agent, etc. . . ) affect the uniformity and conductivity levels of the polypyrrole coating. The conductivity of fabrics was measured by two parallel, two inch long electrodes spaced one inch apart on the surface of the fabric. This measurement was expressed as surface resistivity (ohms per square). A range of 50 to 500,000 ohms per square was measured on surfaces of fabrics described in these patents.

While the above examples describe methods of forming a uniform electroconductive polymeric coating on dielectric substrates, they do not show a dimensionally graded electroconductive polymeric deposit upon the substrate or host.

SUMMARY OF THE INVENTION

This invention consists of a method for producing a dimensionally graded electroconductive and electromagnetically active/responsive composite material. A solution of oxidatively polymerizable compound, which can be oxidized to produce an electroconductive polymer, is prepared. Examples of monomers that can be polymerized to form such electroconductive polymers include pyrrole and aniline. A separate solution of a strong oxidant, for example ferric chloride, is added to the solution of polymerizable compound to initiate the polymerization reaction. A dopant for supplying non-nucleophilic anions, such as p-toluene sulfonate, can be added to the solution to stabilize the polymerized compound. A target substrate material is contacted with the reacting solution so that the electroconductive polymer is deposited on the surface of the substrate over time.

The dimensional gradient is formed by moving the substrate through the reacting solution so that the contact time of the substrate with the solution is varied. This can be accomplished by immersing the substrate into the solution prior to the onset of the polymerization reaction and then gradually removing substrate from the solution after the polymerization of the monomer is initiated. As more electroconductive polymer is deposited on those portions of the substrate that remain in contact with the solution longer, a gradient is formed with an increasing electrical or electromagnetic activity for those portions.

DETAILED DESCRIPTION OF THE INVENTION

Figure 1:
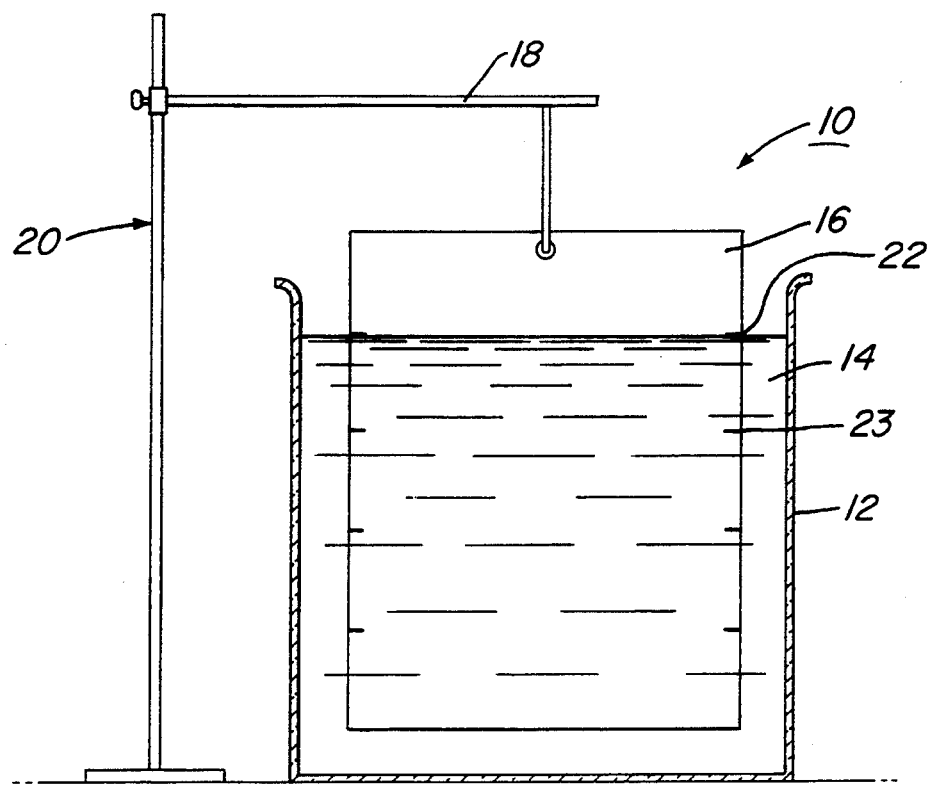
FIG. 1 is a side view of an apparatus used for making the dimensionally graded foam in accordance with this invention.

This invention describes the preparation of an electroactive polyurethane foam material with dimensionally graded electrical conductivity. This is accomplished during a chemical polymerization reaction, where the electroconducting polypyrrole is deposited in graded amounts on surfaces of the polyurethane foam. The effect of the conductivity gradient is achieved during a one-time chemical reaction process by controlling the polypyrrole deposition time. The conducting polypyrrole is deposited as a cohesive film coating on cell surfaces of the polyurethane foam. The amount of deposited polypyrrole deposited on the surfaces of the polyurethane foam constitutes a small percentage of the final weight of the foam.

In this invention, the chemical deposition of the conducting polypyrrole on surfaces of polyurethane foam takes place in a dilute water solution at room temperature. Water is preferred over often toxic or flammable organic solvents in industrial type applications because there is no need for solvent recovery or special handling. Also, organic solvents are likely to affect or degrade the polyurethane foam during coating reactions. As will be shown in the examples that follow, distilled water is the best solvent for these reactions.

Pyrrole is the preferred monomer used in the polymerization reaction to create the electroconductive deposit of polypyrrole. However, derivatives of the pyrrole monomer could also be used. Derivatives of pyrrole monomers include C- and N- substituted pyrrole monomers. The C- substituted pyrrole monomers include 3, and 3,4- alkyl and aryl substituted pyrrole, such as 3-methylpyrrole, 3,4-dimethyl-pyrrole, 3-phenylpyrrole and 3-methyl-4-phenylpyrrole. N- substituted monomers include the N-alkyl and N-aryl pyrrole monomers. These include, for example, N-methylpyrrole and N-phenylpyrrole. Pyrrole, however, results in a higher conducting deposit than the pyrrole derivatives. Aniline is also known to be polymerizable to form an electroconductive polymeric deposit on surfaces of other materials. Pyrrole was chosen over aniline for the coating reactions of the surfaces of the polyurethane foam because of the ease of handling and lower known toxicity of the polymerization reactants, products and by products.

The progress of the polymerization reaction of pyrrole depends on several factors, some of them listed in the previously cited patents and papers. Some detailed studies of the polymerization of pyrrole have been conducted and published in an article by S. P. Armes "Optimum Reaction Conditions for the Polymerization of Pyrrole by Iron (III) Chloride in Aqueous Solution," Synthetic Metals, Vol. 20 (1987), pp. 365-371. The study investigated the optimal conditions for the polymerization of pyrrole with $FeCl_3$ in a water solution. It was established that the reaction progress depends on the concentration of the reactants. It took 8 to 12 hours to complete the polymerization of pyrrole in a 0.144 molar solution in water at 19 degrees C., and 16 to 24 hours to complete a similar reaction, when the pyrrole was diluted to 0.072 molar content. According to Armes, the progress of the reaction was most rapid in the first hour of the reaction. When the solution was more dilute, it was possible to pinpoint the time when the yield of the polymer formed was 20, 35, 45, 50, 75, 80%, etc . . . . Armes also established that the optimal concentration of $FeCl_3$ is approximately 2.4 times the concentration of pyrrole. When hydrated ferric chloride ($FeCl_3 \cdot 6H_2O$) was used, similar optimum initial mole ratios of reactants was determined. The concentration of pyrrole used in the examples described below was kept near 0.04M.

The chemical reaction, in which a conducting polypyrrole film is formed on surfaces of polyurethane foam, is an oxidation reaction wherein the pyrrole monomer is oxidized with a strong oxidant. As described in U.S. Pat. No. 4,617,228, this oxidant can include the cations $Fe^{3+}$, $Cu^{2+}+Ce^{4+}+NO^{+}$ and $(C_6H_5)_3C^{+}$. Compounds providing the above-mentioned cations include the salts ferric perchlorate, ferric chloride, cupric fluoborate, cupric perchlorate, nitrosyl hexafluorophosphate triphenylmethyl fluoborate, ceric sulfate, as well as others. However, ferric chloride was used exclusively in the examples described in the method of this invention. Particularly, hydrated ferric chloride ($FeCl_3 \cdot 6H_2O$) was used. The hydrated ferric chloride is more convenient to use in an industrial setting than is the highly hygroscopic ferric chloride ($FeCl_3$) powder.

The reaction of pyrrole with a strong oxidant, in this case ferric chloride, is thought to occur as follows:

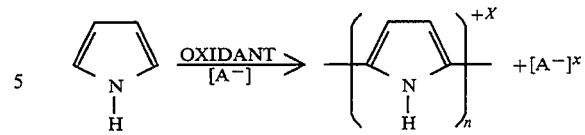

Where $A^-$ is the anion or dopant. The chloride-type anionic species present in the reaction solution can act as counter ions for the positively charged polymer. However, a separate dopant can be used to supply other non-nucleophilic anions to stabilize the polymerized oxidized compound. Aromatic dopants are known to produce stable and highly conductive polypyrrole when present with the polymer. These aromatic dopants can be provided from organic sulfonic acids and their salts. Particularly, p-toluene sulfonate sodium salt can be dissolved in the solution to provide the dopant. In the examples, the concentration of p-toluene sulfonate sodium salt was in a one-to-one or one-to-two ratio to the concentration of pyrrole.

Electroconductive composite materials have a conductivity that can be measured as a surface resistivity and can also be expressed as an electromagnetic loss, measured in decibels (dB), when measured by a free field transmission at the microwave frequencies of 2-18 GHz. Isotropic homogeneous dielectric materials can be characterized in terms of their transmission loss when the electromagnetic radiation passes through the sample. This transmission loss or dissipating electromagnetic energy can be characterized by the following equation:

$$T_{LOSS}(dB) = -20\log \left| \frac{T}{T_o} \right|$$

Where $T_{LOSS}(dB)$ is the transmission loss expressed in "$-dB$", $T_o$ is the incident amplitude and T is the measured transmitted electromagnetic energy.

Measurements in the examples were performed using a two horn system, a receive and transmit horn. The horns were separated electrically by a metal plate that had an aperture through which EM energy could pass. A reference was established by the transmission of EM energy through the unobstructed port. The measurement of the transmitted energy with the aperture covered with the measured material determined the (dB) loss of the material. The size of the aperture could be reduced so that the transmission loss could be measured over areas on the order of a wavelength. This was useful when characterizing the dimensionally graded material.

The measured transmission loss is directly associated with the deposition of the conductive polymer on the dielectric substrate. The amount of the polypyrrole coated on the walls of the polyurethane foam determines the magnitude of electromagnetic loss. The absorption of the EM energy through the coated foam is due to a bulk conductivity through the foam's thickness. The conductivity gradient in the polyurethane/polypyrrole foam produced in this invention yields transmission loss ranging from 0 to $-30$ dB at 10 GHz frequency.

The amount or thickness of the conductive polypyrrole deposited on the surfaces of the polyurethane foam cell walls is regulated by the length of time of the polymerization reaction when the foam is contacted with the solution. By varying the length of contact time of portions of the polyurethane with the solution, a gradient in the amount of polypyrrole deposited on the surface of the foam can be achieved. The contact time can be varied by immersing the polyurethane foam into the reacting solution and then gradually removing the foam as the reaction progresses. This forms a smooth, continuous gradient. Alternatively, the foam may be removed in increments to form graded levels on the foam. Portions of foam that are removed from the solution earlier will have less polypyrrole coated on them. The gradient of polymer deposited also results in a gradient of the bulk conductivity of the composite foam. It should be noted that other porous hosts or substrates could be easily substituted for polyurethane foam that would also provide a dimensionally graded composite material and could be prepared in the same manner.

The graded polyurethane foam/polypyrrole composite material is a light weight, electrically active material with good electrical, chemical and mechanical stability and is easily produced. The polypyrrole coating forms a coherent film on all surfaces of the cell walls and structures of the polyurethane foam. This coating cannot be removed from the polyurethane surface with washing or handling. The coated foam constitutes a durable composite with a permanent bulk conductivity. The foam retains its elasticity and its weight is negligibly increased. The physical appearance and elasticity of the foam produced in the following examples was not changed after 2.5 years time. The electrical properties of the unprotected polyurethane/polypyrrole foam, exposed to average temperature/humidity conditions changed little after 2.5 years from their preparation.

The following examples further illustrate the invention, but should in no way be construed as being limitations of the invention. In all experiments, polyurethane open cell foam of various pores sizes was used. Foam pore size is measured in "pores per inch." The larger the number, the smaller the pore size. Foams of 30 to 45 pores per inch were used in the examples, however, foams with pore sizes as low as 60 pores per inch could be used.

In most of the examples distilled water was used for the reactions. Water was distilled in the lab prior to use and was often warm. This sometimes made it necessary to cool the solution in a cold bath in order to maintain uniform conditions.

EXAMPLE 1

Figure 2:
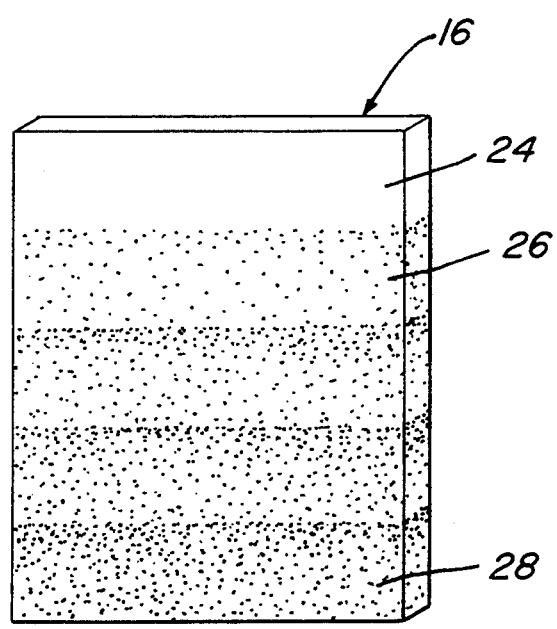
FIG. 2 is a perspective view of a dimensionally graded polyurethane foam made in accordance with this invention using the apparatus of FIG. 1.

Referring to FIG. 1, the method of coating the polyurethane was accomplished by using apparatus 10. This apparatus 10 consists of a glass tank 12 filled with the reacting solution 14 into which the polyurethane foam 16 was placed. The foam 16 was attached to an adjustable arm 18 connected to a stand 20. The open cell polyurethane foam 16, marketed under the name Scotfoam, had a cell size of 45 pores per inch. Foam 16 had dimensions of 10 inches by 9 inches by 1 inch. The foam length was divided into four or five sections and marked with a marking pen. The solution was prepared by filling the glass tank 12 with distilled water and adding sodium p-toluene sulfonate, purchased from Aldrich Chemical Co., Milwaukee, Wis., which was used as a stabilizing dopant, to a 0.04 molar concentration. To this was added pyrrole, purchased from Aldrich Chemical Co., Milwaukee, Wis., which was first purified by passing the pyrrole through one inch of Alumina, to a concentration of 0.04 molar. The reaction solution was then stirred manually with a glass rod and with bubbling of nitrogen gas. A separate container of hydrated ferric chloride ($FeCl_3 6H_2O$), purchased from J. T. Baker, Inc., Phillipsburg, N.J., in the concentration of 0.096 molar, or 2.4 times the concentration of pyrrole, was prepared in distilled water. The glass tank 12 was used for the coating reaction. The polyurethane foam 16 was immersed in the pyrrole/dopant solution up to a first graded mark 22 and allowed to completely soak, until the air contained in the foam cells was replaced by liquid. The ferric chloride solution was then added to the reaction mixture and gently stirred with bubbling nitrogen gas ($N_2$) using two long glass tubes. The addition of ferric chloride oxidant marked the start time of the polymerization reaction on surfaces of the foam. The reacting solution was kept at a temperature of approximately 23° to 25 degrees C. or room temperature. The level of solution was kept to the first grading mark 22 for approximately 20 minutes. The foam was then lifted from the solution to a second grading mark 23. This was repeated until the last grading level was reached, the last grading level was left in the mixture overnight. The foam was then removed and rinsed repeatedly with water. The foam was squeezed and allowed to dry in the air for approximately two days. The resulting foam 16 (FIG. 2) had an uncoated first level 24. The least amount of polypyrrole was deposited on the first graded level 26 and the greatest amount of polypyrrole was deposited on the last graded level 28.

The free field transmission measurements were taken and the average electromagnetic loss at 10 GHz were as follows:

| SECTION | TIME OF COATING | TRANSMISSION LOSS |
| --- | --- | --- |
| 1 | 0 minutes | 0.0 dB Loss |
| 2 | 20 minutes | −6.0 dB Loss |
| 3 | 40 minutes | −10.0 dB Loss |
| 4 | Overnight | −30.0 dB Loss |

EXAMPLE 2

The procedure of Example 1 was substantially followed. Polyurethane foam (45 pores per inch) was divided into five sections. The reaction tank was placed in a cold bath to approximately one-third of its height to keep the solution at room temperature. Three liters of reacting solution was prepared using 11.7 grams of p-toluene sulfonate sodium salt (0.02 molar) and 8.04 grams of pyrrole (0.04 molar). A separate solution of 81.03 grams of hydrated ferric chloride in the concentration of 0.096 molar was made. The foam was immersed in the pyrrole/sodium tosylate solution to the first mark and the air was squeezed out. The ferric chloride was then added and the reaction was stirred by bubbling with a small stream of nitrogen gas. Each graded section was left in the solution for 15 minute intervals, the last section being maintained in the solution for 60 minutes. The foam was then removed from the solution, rinsed and dried. The following electromagnetic loss was measured at the free field transmission at 10 GHz.

| SECTION | TIME OF COATING | TRANSMISSION LOSS |
| --- | --- | --- |
| 1 | 0 minutes | 0.0 dB Loss |
| 2 | 15 minutes | −13.0 dB Loss |

-continued

| SECTION | TIME OF COATING | TRANSMISSION LOSS |
|---|---|---|
| 3 | 30 minutes | −17.5 dB Loss |
| 4 | 45 minutes | −19.0 dB Loss |
| 5 | 60 minutes | −22.0 dB Loss |

EXAMPLE 3

The procedure of Example 2 was substantially followed. Three pieces of foam with a larger pore size, 30 pores per inch, were coated in three separate reaction treatments. The reaction solution concentrations, conditions and the length of coating time on each grading section was kept as in Example 2, except that more reacting solution of the same molar concentration of reactants was prepared (4.5 liters). The following free field transmission loss was measured at 10 GHz.

| SECTION | TIME OF COATING | TRANSMISSION LOSS Foam 1 | Foam 2 | Foam 3 |
|---|---|---|---|---|
| 1 | 0 minutes | 0.0 dB | 0.0 dB | 0.0 dB |
| 2 | 15 minutes | −5.5 dB | −6.1 dB | −6.2 dB |
| 3 | 30 minutes | −9.0 dB | −9.8 dB | −10.5 dB |
| 4 | 45 minutes | −12.0 dB | −11.9 dB | −11.9 dB |
| 5 | 60 minutes | −13.3 dB | −15.1 dB | −13.7 dB |

EXAMPLE 4

The conditions and concentrations were kept the same as in Examples 2 and 3. A piece of polyurethane foam having the dimensions of 11 inches by 10 inches by 1 inch with a pore size of 45 pores per inch was divided into five sections. The coating times for each section were 5, 10, 20 and 60 minutes respectively. The following results were obtained:

| SECTION | TIME OF COATING | TRANSMISSION LOSS |
|---|---|---|
| 1 | 0 minutes | 0.5 dB Loss |
| 2 | 5 minutes | −3.5 dB Loss |
| 3 | 10 minutes | −6.5 dB Loss |
| 4 | 15 minutes | −9.0 dB Loss |
| 5 | 60 minutes | −22.5 dB Loss |

EXAMPLE 5

Three polyurethane foams having pore sizes of 45 pores per inch were coated and graded in three separate experiments. The reaction conditions and the concentrations were the same as in Example 2. Four sections of polyurethane were coated in 15 minute intervals, each section having a coating time of 15, 30, 45 and 60 minutes respectively. An additional piece of foam was placed in the solution overnight after the grading of the fourth section was completed. The following results were obtained at a frequency of 10 GHz.

| SECTION | TIME OF COATING | TRANSMISSION LOSS Foam 1 | Foam 2 | Foam 3 |
|---|---|---|---|---|
| 1 | 15 minutes | −8.5 dB | −10.9 dB | −8.2 dB |
| 2 | 30 minutes | −19.0 dB | −16.9 dB | −14.2 dB |
| 3 | 45 minutes | −21.0 dB | −18.6 dB | −18.1 dB |
| 4 | 60 minutes | −22.9 dB | −20.1 dB | −24.0 dB |
| Additional Foam | Overnight | −29.3 dB | | |

Examples 1–5 demonstrate that the dielectric polyurethane foam can be made conductive and the conductivity levels in the resulting material can be dimensionally graded during a one-time reaction treatment. Polyurethane foam was exposed to the reacting solution wherein an electroconductive polymer, polypyrrole, was deposited on the surfaces of the foam cells. The amount of the deposited polypyrrole was graded by varying the length of time the foam was in contact with the reacting solution. The conductivity levels in the resulting coated foam were measured as the electromagnetic transmission loss. Higher transmission loss was obtained with the foam having the smaller pore size of 45 pores per inch. This may be explained by the fact that more wall surface was present in the foam with smaller pore size so that more polypyrrole could be deposited. However, foam with a larger pore size (30 and 45 pores per inch) was easier to handle in the water solution. It became more difficult to insure the complete wetting of the foam and the exclusion of all trapped air in the cells of foam having a smaller pore size, for example 60 or more pores per inch.

Different results were achieved using distilled water than were achieved using undistilled. The following are examples where undistilled tap water was used as a solvent in the reactions.

EXAMPLE 6

Four liters of solution were prepared with undistilled tap water using sodium p-toluene sulfonate in a 0.02 molar concentration with a pyrrole concentration of 0.04 molar. A polyurethane foam with 45 pores per inch was soaked in the solution up to a first grading level. Ferric chloride was dissolved and added to the solution and gently stirred. The grading of the polypyrrole coating thickness was accomplished as in the previous examples. After the grading was finished, an additional foam was placed in the reaction tank and coated overnight by the slowly forming polypyrrole. The following results were obtained.

| SECTION | TIME OF COATING | TRANSMISSION LOSS |
|---|---|---|
| 1 | 0 minutes | −0.1 dB Loss |
| 2 | 5 minutes | −0.2 dB Loss |
| 3 | 15 minutes | −0.4 dB Loss |
| 4 | 25 minutes | −2.0 dB Loss |
| 5 | 105 minutes | −6.1 dB Loss |
| Additional Foam | overnight | −31.8 dB Loss |

EXAMPLE 7

Undistilled tap water was used as in Example 6 except different coating times were applied. The following results were obtained with a similar foam (45 pores per inch).

| SECTION | TIME OF COATING | TRANSMISSION LOSS |
|---|---|---|
| 1 | 15 minutes | −0.5 dB Loss |
| 2 | 32 minutes | −1.2 dB Loss |
| 3 | 47 minutes | −2.1 dB Loss |
| 4 | 60 minutes | −3.7 dB Loss |

It is obvious that the polymerization of polypyrrole on surfaces of polyurethane foam proceeded much slower when an undistilled, tap water was used, as illustrated in Examples 6 and 7. This was easily visible during the first hour of the coating reaction. The reaction solution darkened much slower (indicating slower polymerization) than in other reactions, where distilled water was used. The amount of polypyrrole deposited on surfaces of polyurethane foam during the first hour of coating was much smaller than in Examples 1-5. The polymerization of pyrrole continued for several hours and produced a thick coating on surfaces of the additional foam that was placed in the reaction solution overnight (transmission loss of −31.8 dB). It cannot readily be explained why the polymerization of pyrrole on the surfaces of the polyurethane foam in the undistilled tap water was slower than in distilled water.

Figure 3:
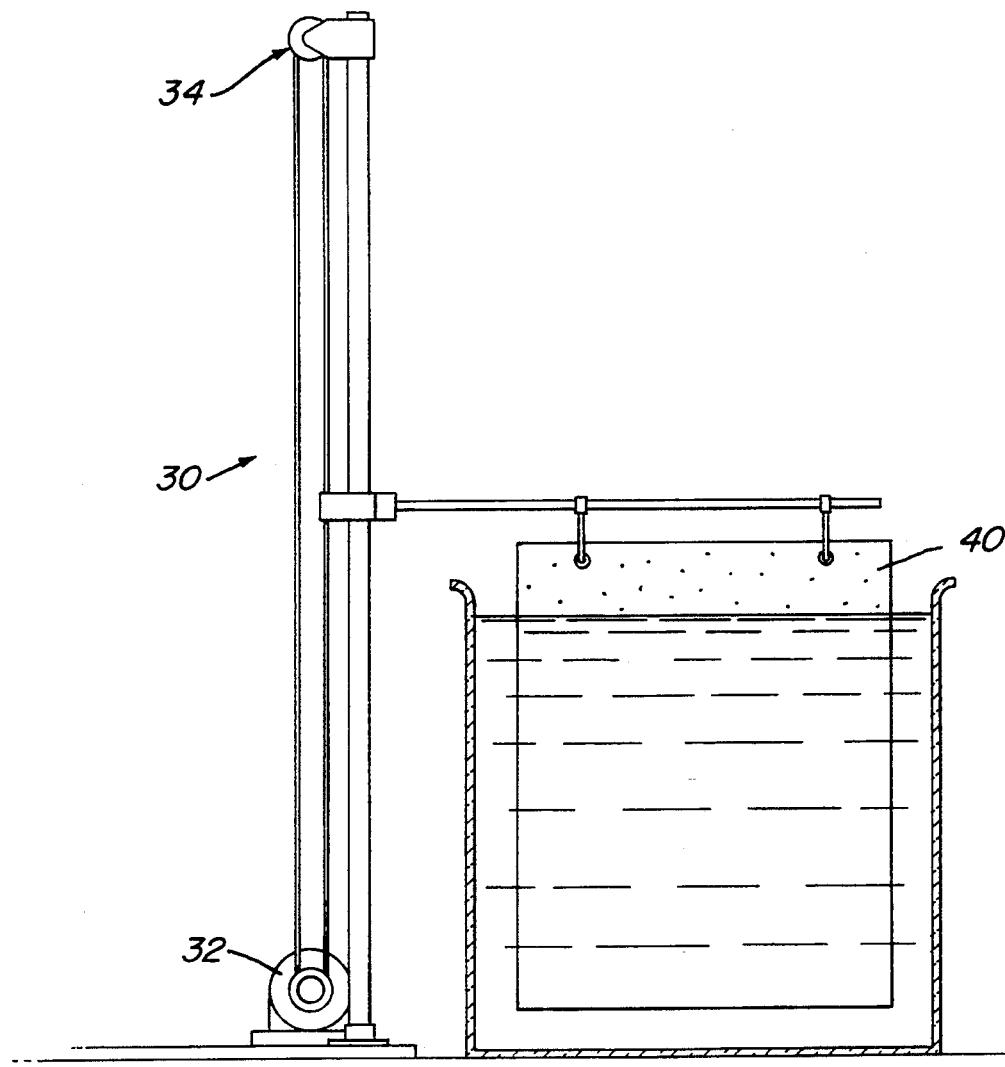
FIG. 3 is another embodiment of the apparatus of FIG. 1 used to make the dimensionally graded foam in accordance with this invention.
Figure 4:
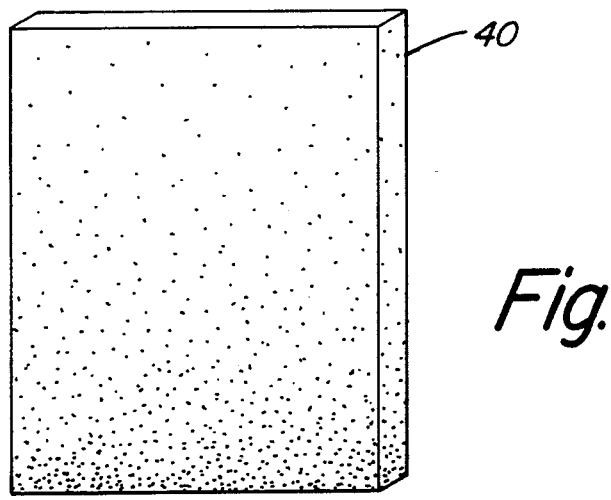
FIG. 4 is a perspective view of the dimensionally graded foam using the apparatus of FIG. 3.

As shown from the examples 1-5, the transmission loss produced in a single piece of foam can range from 0 to approximately −30 dB at 10 GHz and can be produced from a one time coating treatment. A very smooth and continuous gradient can also be achieved by employing a simple mechanism for a continuous, slow removal of the foam from the reacting solution instead of removing the foam in increments. Such an apparatus 30 is shown in FIG. 3. This apparatus 30 is similar to the one shown in FIG. 1 except that a motor 32 attached to a pulley system 34 allows the foam to be pulled from the solution at a continuous rate. The resulting foam 40 (FIG. 4) is produced.

Figure 5:
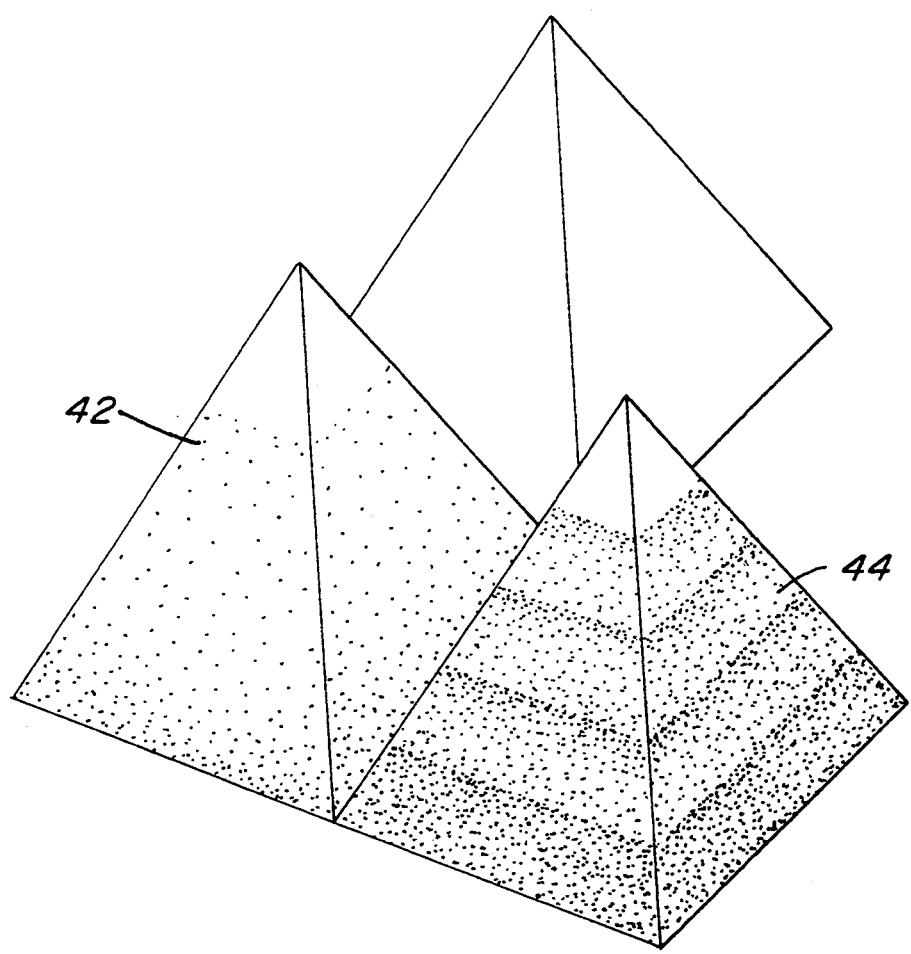
FIG. 5 is a perspective view of a dimensionally graded cone used in an anechoic chamber and constructed in accordance with this invention.

As shown in FIG. 5, composite cones 42, 44 that can be used as electromagnetically responsive bulk absorbers in anechoic chambers can be produced using the method described above. Each composite cone 42, 44 is made from a solid piece of porous polyurethane open cell foam, such as the foam described in the examples, that is in the shape of a pyramid. The uncoated cones are initially immersed in a solution of pyrrole and the polymerization reaction is initiated with the addition of oxidant.

By gradually removing the cone from the reacting solution with the top of the cone being removed first and the bottom being removed last, the cone 42 can be produced. A continuous gradient of electroconducting polypyrrole is produced on the surfaces of the cone 42 with the amount of polypyrrole coated increasing along the longitudinal axis of the cone from the top to the bottom.

Alternatively, the uncoated cone can be removed from the reacting solution of pyrrole incrementally to form the cone 44. Here the amount of polypyrrole coated on the surfaces of the cone 42 is graded in levels with lower amounts of polypyrrole being coated on the top of the cone 44, and higher amounts being coated at the bottom of the cone 44. Both cones 42, 44 can then be positioned within an anechoic chamber to serve as electromagnetically responsive bulk absorbers.

The composite material of this invention has advantages over the prior art methods of producing electroconductive composite materials in that it forms a continuous gradient achieved in a one-time chemical process. There is no need to combine separately prepared composite materials to produce a single piece of material having a gradient. The degree of bulk conductivity achieved can be easily controlled merely by varying the rate at which the material is removed or immersed in the solution.

While the invention has been shown in only one of its forms, it should be apparent to those skilled in the art that it is not so limited, but is susceptible to various changes without departing from the scope of the invention.

We claim:

1. A three-dimensional electroconducting composite material that can be used as an electromagnetically responsive bulk absorber, the composite material comprising in combination:
   a porous polyurethane open cell foam substrate having opposite ends and a length, at least a portion of the substrate having a thickness of at least one inch; and
   a coating of electroconductive polymer formed by chemical polymerization throughout the substrate, the amount of polymer coated on the substrate increasing along the length of the substrate from one end of the substrate to the other so that a dimensional conductivity gradient is formed along the length of the substrate.

2. The composite material of claim 1, wherein:
   the polyurethane foam substrate has a pore size in the range of 30 to 60 pores per inch.

3. The composite material of claim 1, wherein: the electroconductive polymer is polypyrrole.

4. The composite material of claim 1, wherein:
   the coating of electroconductive polymer is formed in a chemical reaction by preparing a solution of a polymerizable monomer that can be polymerized to form the electroconductive polymer, contacting at least a portion of the substrate in the solution of polymerizable monomer, initiating the polymerization reaction of the polymerizable monomer so that the electroconductive polymer is deposited on the substrate over time, and then varying the contact time of the substrate with the solution of polymerizable monomer.

5. The composite material of claim 4, wherein:
   the polymerizable monomer is pyrrole.

6. The composite material of claim 4, wherein:
   the polymerizable monomer is oxidatively polymerized by adding an oxidant to the solution.

7. The composite material of claim 6, wherein:
   the oxidant is provided by a ferric chloride salt.

8. The composite material of claim 4, wherein:
   the solution is an aqueous solution.

9. The composite material of claim 4, wherein:
   a stabilizing dopant is added to the solution for stabilizing the polymer.

10. The composite material of claim 9, wherein:
    the stabilizing dopant is supplied by a p-toluene sulfonate sodium salt.

11. A three-dimensional electroconductive composite material that can be used as an electromagnetically responsive bulk absorber, the composite material comprising in combination:
    a porous polyurethane open cell foam substrate having opposite ends and a length, at least a portion of the substrate having a thickness of at least one inch;
    a coating of electroconductive polypyrrole throughout the substrate, the amount of polypyrrole coated on the substrate increasing along the length of the substrate from one end to the other so that a dimensional conductivity gradient is formed along the length of the substrate, the coating being formed in a chemical reaction by preparing a solution of pyrrole that can be oxidatively polymerized to form the electroconductive polypyrrole, contacting at least a portion of the substrate in the solution of pyrrole monomer, initiating the polymerization reaction of the pyrrole so that the electroconductive polypyrrole is deposited on the substrate over time, and then varying the contact time of the substrate with the solution of pyrrole.

12. The composite material of claim 11, wherein: the polyurethane foam substrate has a pore size in the range of 30 to 60 pores per inch.

13. The composite material of claim 11, wherein: the pyrrole is oxidatively polymerized by adding an oxidant provided by a ferric chloride salt.

14. The composite material of claim 11, wherein: the contact time is varied by immersing the substrate into the solution; and then
gradually removing the substrate from the solution.

15. The composite material of claim 11, wherein: the contact time is varied by immersing the substrate into the solution; and then
incrementally removing the substrate from the solution.

16. The composite material of claim 11, wherein: a stabilizing dopant is added to the solution to stabilize the polypyrrole.

17. The composite material of claim 16, wherein: the stabilizing dopant is supplied by a p-toluene sulfonate sodium salt.

18. A composite cone used as an electromagnetically responsive bulk absorber in an anechoic chamber, the composite cone comprising in combination:
a porous polyurethane open cell foam substrate having a pyramidical shape, the top of the substrate forming a peak and the bottom forming a base, the substrate having a longitudinal axis that extends from the top to the bottom; and
a coating of electroconductive polymer formed by chemical polymerization throughout the substrate, the amount of polymer coated on the substrate increasing along the longitudinal axis of the substrate so that a dimensional conductivity gradient is formed by the coating along the longitudinal axis of the substrate.

19. The composite cone of claim 18, wherein: the amount of polymer coated on the substrate increases along the longitudinal axis from the top of the substrate to the bottom so that the top of the substrate has a lower conductivity than the bottom.

20. The composite cone of claim 18, wherein: the electroconductive polymer is polypyrrole.

21. The composite cone of claim 18, wherein: the coating of electroconductive polymer is formed in a chemical reaction by preparing a solution of a polymerizable monomer that can be polymerized to form the electroconductive polymer, contacting at least a portion of the substrate in the solution of polymerizable monomer, initiating the polymerization reaction of the polymerizable monomer so that the electroconductive polymer is deposited on the surfaces of the substrate over time, and then varying the contact time of the substrate with the solution of polymerizable monomer.

22. The composite cone of claim 21, wherein: the polymerizable monomer is pyrrole.

23. The composite cone of claim 21, wherein: the polymerizable monomer is oxidatively polymerized by adding an oxidant to the solution.

24. The composite cone of claim 21, wherein: the contact time is varied by immersing the substrate into the solution; and then
gradually removing the substrate from the solution so that the top of the substrate is removed first and the bottom of the substrate is removed last.

25. The composite cone of claim 21, wherein: the contact time is varied by immersing the substrate into the solution; and then
incrementally removing the substrate from the solution so that the top of the substrate is removed first and bottom of the substrate is removed last.

* * * * *